Feb. 24, 1942.  L. J. FICHTER  2,273,946
INDICATOR
Filed July 27, 1939  4 Sheets-Sheet 1

Inventor
Ludwig J. Fichter
By
Blackmore, Spencer & Flint
Attorneys

Feb. 24, 1942. L. J. FICHTER 2,273,946
INDICATOR
Filed July 27, 1939 4 Sheets-Sheet 2
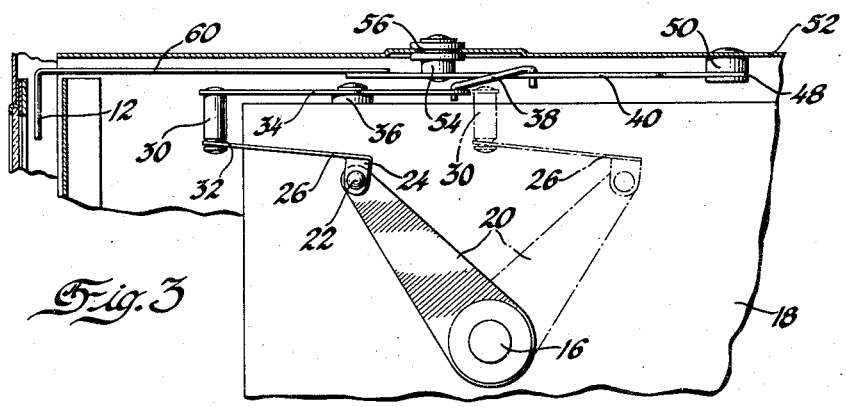
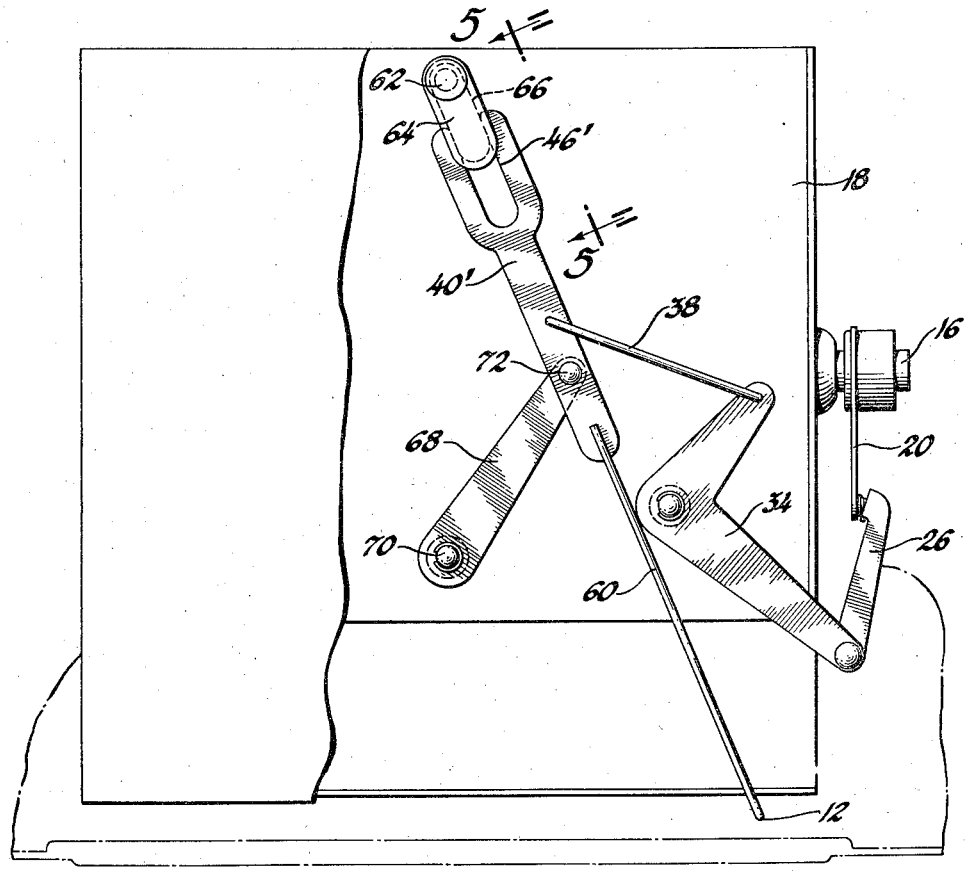
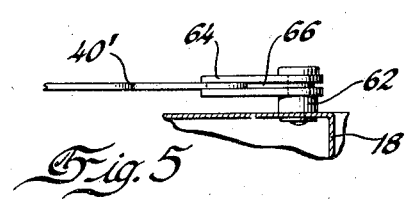
Inventor
Ludwig J. Fichter Feb. 24, 1942.  L. J. FICHTER  2,273,946
INDICATOR
Filed July 27, 1939  4 Sheets-Sheet 3

Inventor
Ludwig J. Fichter
By
Blackmore, Spencer & Hirt
Attorneys

Feb. 24, 1942. L. J. FICHTER 2,273,946
INDICATOR
Filed July 27, 1939 4 Sheets-Sheet 4
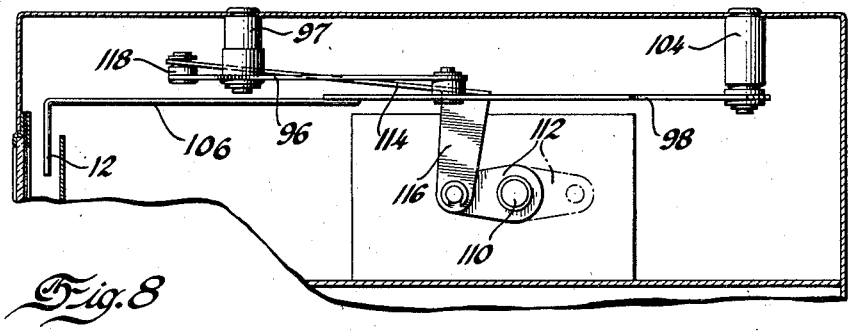
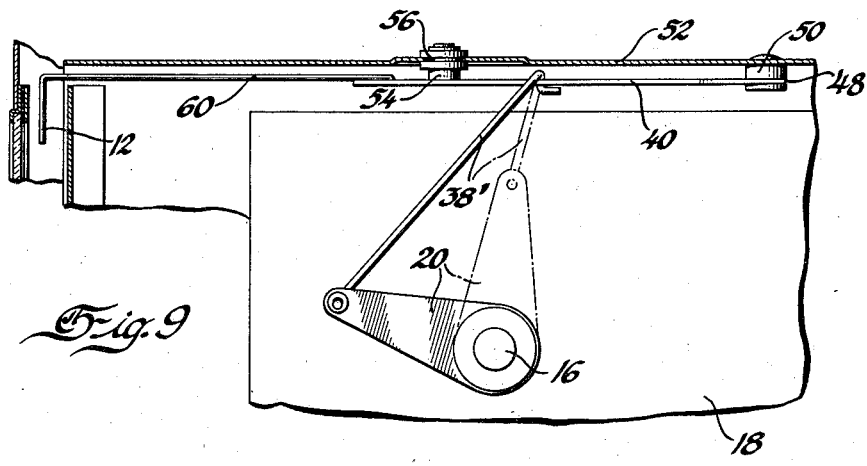
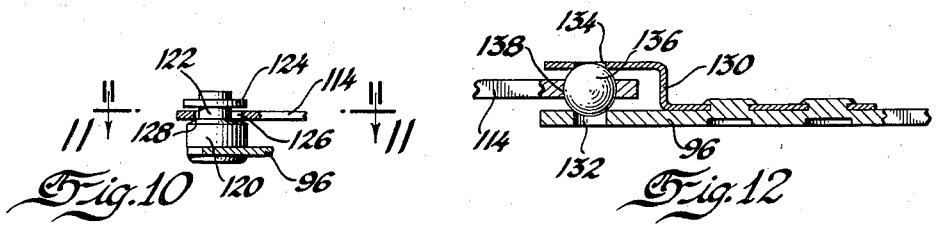
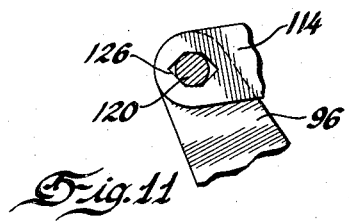
Inventor
Ludwig J. Fichter
By
Blackmore, Spencer & Flint
Attorneys Patented Feb. 24, 1942

2,273,946

UNITED STATES PATENT OFFICE 2,273,946

INDICATOR

Ludwig J. Fichter, Kokomo, Ind., assignor to General Motors Corporation, Detroit, Mich., a corporation of Delaware Application July 27, 1939, Serial No. 286,806

4 Claims. (Cl. 116—124.1)

This invention relates to indicating mechanisms and more specifically to means for indicating the position of certain apparatus whose setting is altered for tuning radio apparatus. With the increased use of longitudinally actuated push buttons to automatically tune a receiver to given stations and the use of such equipment in automotive vehicles, certain problems have arisen. It is desired to keep the force required to actuate the push button to a minimum and at the same time move the indicator over a substantial distance. This distance is necessary for several reasons: First it gives easier station separation since the identifying marks are more widely separated, and, secondly, in automotive installation is provides a dial that will tone in with the other instruments of the car. In this latter respect it is advantageous to use a straight line dial as it blends in with the present type instruments and in addition lends itself best to a row of push buttons. All car instruments are now kept in substantially a single plane so there will be no projecting means for safety of the passengers.

It is therefore an object of my invention to provide indicating mechanism that may be operated over a substantial distance with a minimum of energy.

It is a further object of my invention to provide indicating means that shall travel over substantially a straight line.

It is a further object of my invention to provide the aforesaid apparatus in as simple and foolproof design as possible.

With these and other objects in view, the embodiments of my invention are best described in the following specification and claims which are illustrated in the accompanying drawings, in which:

Figure 3 is a partial section taken on line 3—3 of Figure 1 with parts broken away.

Figure 4 is a top plan view similar to Figure 2 of a modified form of my invention.

Figure 5 is a sectional view taken on line 5—5 of Figure 4.

Figure 8 is a sectional view similar to Figure 7 showing a modified form of connection.

Figure 9 is a vertical section showing a modified form of connection for the general form shown in Figures 1–3.

Figure 10 is an enlarged detailed sectional view showing one form of universal connection.

Figure 11 is a sectional view taken on line 11—11 of Figure 10.

Figure 12 is a detailed sectional view showing a further form of universal connection.

Figure 1:
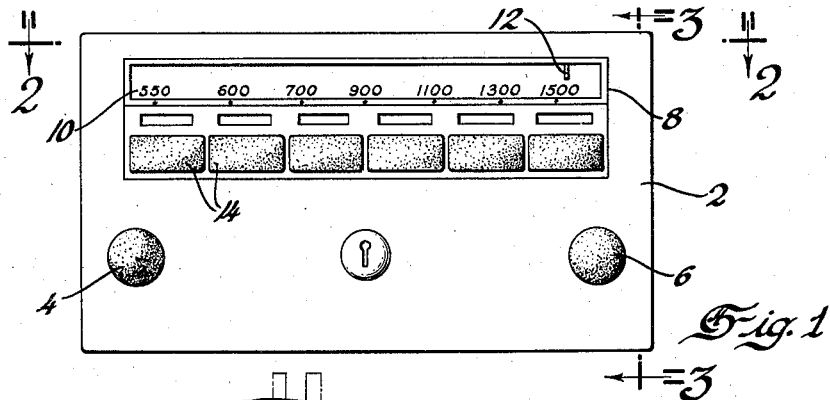
Figure 1 is a front elevation showing the general appearance of the outside of an automotive radio receiver.

The general form of these radio receivers has been that shown substantially in Figure 1 in which the dial face, which either projects through the instrument panel of a vehicle or is supported so that it will show below the instrument panel, is as indicated at 2. This is of course roughly rectangular and has openings for certain control shafts 4 and 6 at the lower portion and a rectangular cutout portion shown at 8 through which the tuning scale 10 and the indicating pointer 12 are visible. In the more recent sets of course there are also the push buttons 14 which turn the set to a series of preselected stations.

Since the visible face is substantially flat the pointer 12 must move the full width of the scale between the apparatus mounted to the rear thereof and the glass front which limits it to substantially a straight line. Also, since the casing at this point is comparatively shallow, it is necessary to design the means for operating the pointer so that it will fit within a thin opening.

Figure 2:
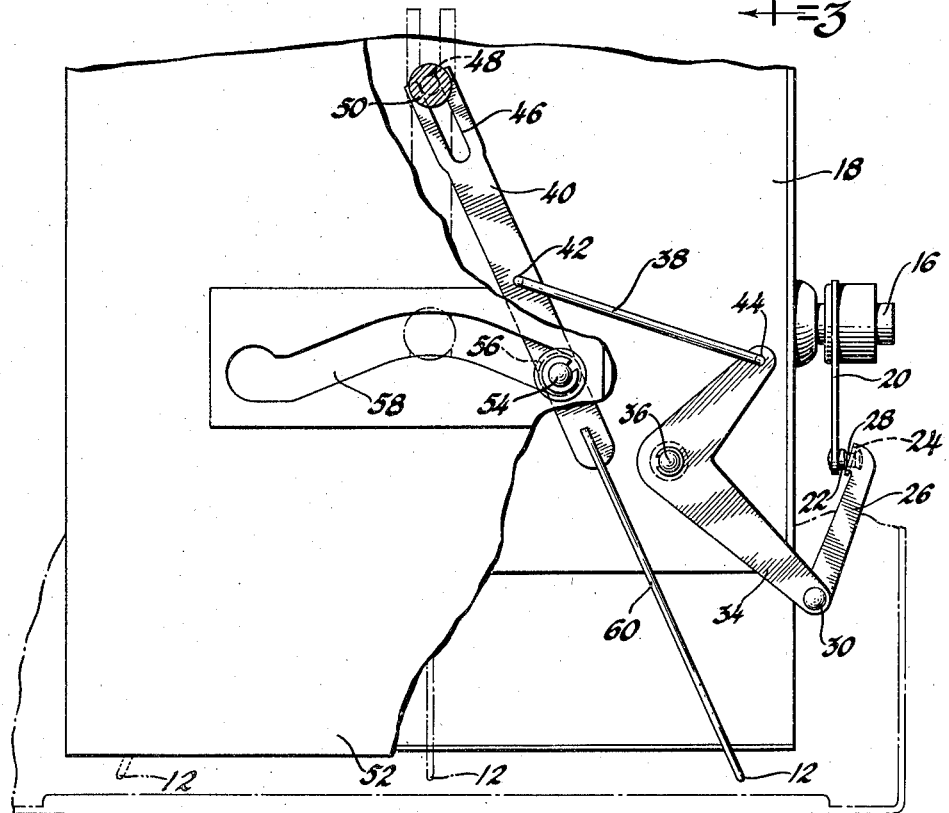
Figure 2 is a top plan view of the indicating mechanism, parts being broken away and taken on line 2—2 of Figure 1.

One form of accomplishing this drive is shown in Figures 2 and 3 and in this case a shaft 16 projects from the housing 18 which encloses the tuning means which may be condensers, said shaft having secured thereto a lever 20 which carries at its outer end a small pin 22 which projects through a flange 24 on the end of a connecting lever 26. As is best shown in Figure 2, the pin 22 has a reduced neck portion 28 which has some axial distance, this portion being that which engages the opening in the flange 24. This axial distance on the pin neck allows the lever 26 to move longitudinally about the pin 22 to some extent to give some amount of universal motion. The opposite end of the lever 26 is secured in a similar manner to one end of a connecting pin 30 which also has a reduced portion 32 for the opening in the lever 26 and this reduced portion is again slightly longer axially than the thickness of the lever to provide for some play.

The opposite end of the pin 30 is rigidly connected to a bell crank lever 34, the latter being pivoted at 36 to the housing 18. The other angular arm of the bell crank 34 is connected through a wire rod 38 to a long lever 40 by extending through openings 42 and 44 in the lever 40 and the end of the bell crank arm respectively. The lever 40 has at one end a long U-shaped slot 46 cut therein and this is adapted to slide in a groove 48 in a supporting pin 50 which is rigidly connected to the top of the casing 52. This groove 48 is annular and so as the lever 40 swings about the pivot 50 it may reciprocate with respect thereto due to the annular slot 48 and the U-shaped slot 46 on the end of the lever. Rigidly connected to the lever 40 ahead of the connection 42 to the rod 38 is a small pin 54 which is provided near its upper end with an annular groove 56 which is adapted to slide in an arcuate slot 58 provided in the upper surface of the casing 52. This is best shown in Figure 2.

Rigidly secured to and in alignment with the axis of the lever 40 near its front end is a small wire 60 which actually carries and is a part of the indicating needle 12. From this construction it is evident that as the lever 40 is forced, let us say, to the left in Figure 2, that the cam action of the annular groove 56 in the pin 54 with the slot 58 will cause the lever 40 to move slightly to the rear as it swings to the left. Therefore the indicating pointer 12 instead of prescribing an arc about the axis of the pin 50 will be drawn to the rear sufficiently by the camming action to cause it to maintain a substantially straight line across the dial plate. Two other positions of the pointer are shown by dotted lines on Figure 2. Of course the function of the bell crank and various connecting levers is merely to translate the rotary motion of the shaft 16 into a force causing the arm 38 to force the lever 40 back and forth, depending upon the position of the tuning shaft and a sufficient amount of play is put in certain connecting joints to take care of any misalignment of the parts at particular positions.

In some instances where it may be possible to remove portions of the apparatus which normally project in the way of certain mechanical motion it may be possible to eliminate the lever 26 and bell crank 34 and to extend the wire rod 38, as shown at 38', directly to the end of the rotating lever 20, as shown in Figure 9, and in this instance this would considerably simplify the connecting lever arrangement. It may also be possible to substitute a flexible cable or cord having either a double or single way drive with a spring without departing from the essence of my invention.

A modified form of this general construction is shown in Figures 4 and 5 and in this instance the housing 18, shaft 16, lever 20, lever 26, bell crank 34 and connecting link 38 are identical with those same parts as shown in Figures 2 and 3. However, in this instance the lever 40 has been altered, as shown at 40', to have a slightly different slidable connection at the rear. A U-shaped slot 46' is again provided but in this instance a short vertical pin 62 pivotally carries an elongated oval member 64 which has a groove 66 running entirely around the edge and in this groove are adapted to slide the two ends of the lever 40'. Also, instead of providing a cam and slot arrangement as in Figure 2, a lever 68 pivotally supported at 70 to the upper surface of the casing 18 is provided which is pivotally secured to the lever 40' at 72. Thus as the lever 40' is forced to the left as shown in Figure 4, the lever 68 rotating about its pivot 70 would force the lever 40' toward the rear and maintain the indicator 12 in substantially straight line movement.

Figure 6:
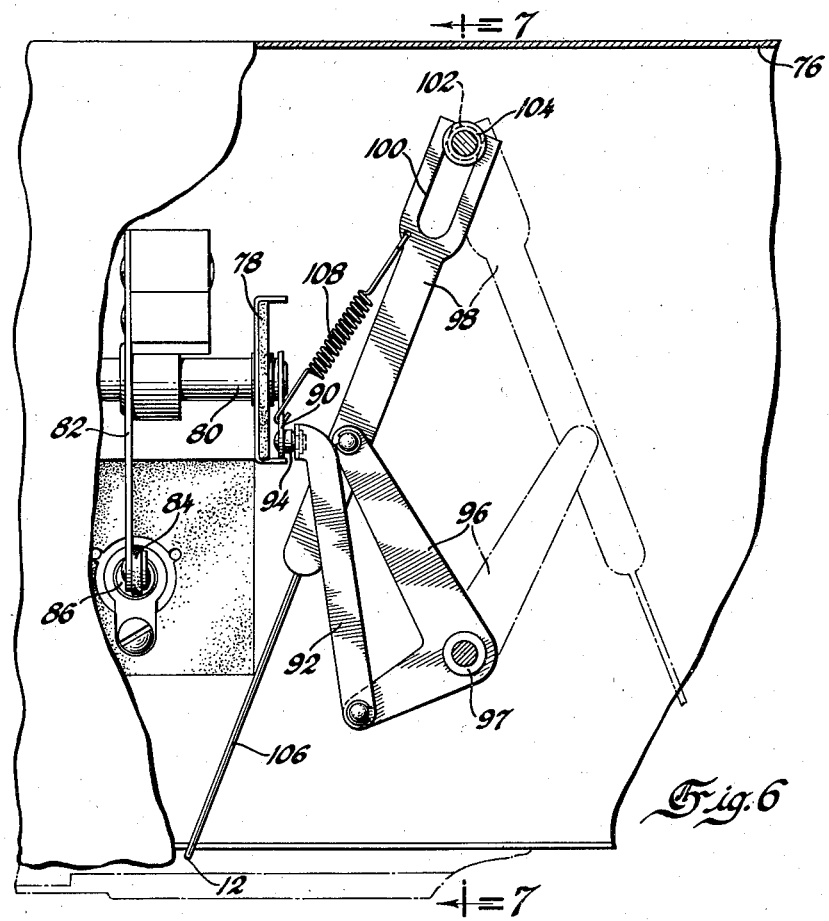
Figure 6 is a top plan view similar to Figure 2 of a further modified form of my invention.
Figure 7:
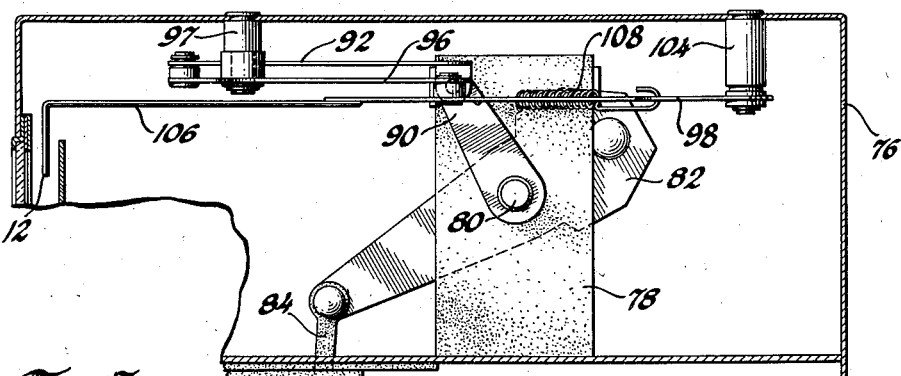
Figure 7 is a partial sectional view taken on line 7—7 of Figure 6.

There are certain instances in which instead of rotating a shaft to vary the position of variable condensers for radio tuning that the inductance of certain parts is changed for tuning by moving a core within a coil. When this type of construction is used a design as shown in Figures 6 and 7 may be utilized for indicating. In this case a housing 76 is provided in which there are spaced vertical members 78 of insulating material which carry a rotatable shaft 80. Secured to this shaft at a point intermediate their ends are a plurality of arms 82, one end of which is pivotally connected to links 84 the opposite ends of which are connected directly to reciprocating cores 86 which are adapted to be variably positioned within coils 88 for tuning purposes. There are usually a number of these coil assemblies in a single set, the number depending upon the size and value thereof, but only one is shown and described as the rest are mere duplicates. Therefore as the shaft 80 is rotated the cores will be withdrawn or forced within the coils and the set tuned.

Rigidly secured to the outer end of the shaft 80 is a lever 90 and to the rotating outer end of the lever 90 is connected a link 92 through a similar universal connection 94 as that described in the previous constructions. The end of the link 92 is pivotally connected to a bell crank 96 which is itself pivoted on pin 97 which is supported from the upper wall of the casing 76, and the opposite leg of the bell crank is in turn connected to a long lever 98, the inner end of which is slotted as at 100 to engage an annular groove 102 in a supporting pin 104 substantially the same as the construction shown in Figure 2. The forward end of the lever 98 as before carries a wire rod 106 and supports the indicator 12. Stretched between the lever 90 and the lever 98 is a tension spring 108 for maintaining the two in juxtaposition and taking up any lost motion between parts. Thus as the shaft 80 is turned and the lever 90 moved back and forth through approximately 60° the bell crank will be rotated about its pivot 97 through the link 92 and the indicator 12 will be moved back and forth across the forward face of the housing in substantially a straight line.

As before mentioned, when this type of tuning just described is utilized it is only necessary to move the shaft through approximately 60 angular degrees to obtain a full tuning range. However, when condensers are used with this design it might be necessary to rotate the shaft carrying said condensers through approximately 180° and in this instance it is necessary to alter the design slightly as shown in Figure 8. In this instance the shaft 110 is adapted or designed to rotate through substantially 180° as shown by the dotted line position. A lever 112 is secured thereto as in previous instances and the lever 92 is replaced by a similar lever 114 having a longer vertical extension 116, the opposite end is however still connected to one end of the bell crank 96 through a lost motion or universal connection 118 similar to those already described; otherwise the construction is the same as that shown in Figures 6 and 7.

Figures 10 and 11 illustrate one form of lost motion or universal joint as used in the above constructions and in this instance a lever such as 96 is shown rigidly supporting a stud 120 which has a reduced portion 122 and then there is forced upon the reduced portion a small washer 124. Between the washer 124 and the shoulder there is carried the end of a second lever such as 114 which it is desired to pivotally connect to the member 96, said lever 114 having an hexagonal opening 126 therein so that the two levers may have a certain degree of universal motion. The washer 124 is spaced a sufficient distance from the lever 114 so that this movement is possible and the shoulder 128 is tapered to also provide for this movement.

A similar construction is shown in Figure 12 where a lever such as 96 may have an angled bracket 130 riveted thereto to provide a space between the angled end and the lever, both having aligned openings such as 132 and 134 therein to frictionally support a ball such as 136. The lever to which the first lever is to be universally joined such as 114 would be then provided with an opening 138 within which the ball might rest and the snap friction between the angled bracket 130 and the lever 96 would then hold the ball in place and provide the desired universal movement. It will also be evident that by varying the cam contour that the indicating needle may be made to follow any other desired path than a straight one if the requirements call for such.

I claim:

1. In a tuning indicator for automobile radio receivers, a housing, a fixed pivot, a lever having an elongated slot therein mounted on the pivot whereby the lever may have both rotational and reciprocable motion with respect to the pivot in a plane adjacent a side of said housing, a pin rigidly connected to the lever, cam means cooperating with the pin to reciprocate the lever as it is rotated, means for rotating said lever, said means comprising a rotatable shaft and a linkage connecting said shaft to said lever.

2. In a tuning indicator for automobile radio receivers, a housing, a pivot carried thereby, a lever having a slot therein carried on the pivot for both rotation about and reciprocation with respect thereto in a plane adjacent a side of said housing, a scale carried by the housing, a pointer carried by the lever and adapted to move in juxtaposition to the scale, a pin rigidly secured to the lever, said housing having an arcuate cam slot therein in which said pin travels to provide reciprocation of the lever as it is swung about its pivot whereby the pointer travels in substantially a straight line.

3. In a tuning indicator for automobile radio receivers, a housing, a pivot carried thereby, a lever having a slot therein carried on the pivot for both rotation about and reciprocation with respect thereto in a plane adjacent a side of said housing, a scale carried by the housing, a pointer carried by the lever and adapted to move in juxtaposition to the scale, a pin rigidly secured to the lever, said housing having an arcuate cam slot therein in which said pin travels to provide reciprocation of the lever as it is swung about its pivot whereby the pointer travels in substantially a straight line, a rotatable control shaft mounted in the housing, a mechanical interlinkage connected between the shaft and the lever to transmit the rotary motion of the former to force the latter about its pivot.

4. In a tuning indicator for automobile radio receivers, a housing, a pivot carried thereby, a lever having a slot therein carried on the pivot for both rotation about and reciprocation with respect thereto in a plane adjacent a side of said housing, a scale carried by the housing, a pointer carried by the lever and adapted to move in juxtaposition to the scale, a pin rigidly secured to the lever, said housing having an arcuate cam slot therein in which said pin travels to provide reciprocation of the lever as it is swung about its pivot whereby the pointer travels in substantially a straight line, a rotatable control shaft mounted in the housing, a mechanical interlinkage connected between the shaft and the lever to transmit the rotary motion of the former to force the latter about its pivot and at least one universal joint connection in the interlinkage.

LUDWIG J. FICHTER.